United States Patent [19]
Westphalen

[11] 3,812,509
[45] May 21, 1974

[54] MULTIFOCAL ADAPTER FOR CAMERAS

[76] Inventor: Leonard F. Westphalen, 2021 Market St., San Diego, Calif. 92102

[22] Filed: Apr. 14, 1972

[21] Appl. No.: 244,207

[52] U.S. Cl. .............................................. 354/195
[51] Int. Cl. .......................................... G02b 15/10
[58] Field of Search .................. 95/44 R, 39, 50, 51

[56] References Cited
UNITED STATES PATENTS
3,388,650  6/1968  Westphalen .................. 95/44 R
3,333,521  8/1967  Daniel .......................... 95/44 R
FOREIGN PATENTS OR APPLICATIONS
2,811  2/1886  Great Britain .................. 95/44 R

*Primary Examiner*—John M. Horan
*Attorney, Agent, or Firm*—Johnson, Dienner, Emrich, Verbeck & Wagner

[57] ABSTRACT

A camera is modified by relocating its objective on a lens standard which slides on a guide fastened to the underside of the camera. The lens standard also supports a negative lens or lenses on its rear side for positioning into and out of axial alignment between the lens openings of the standard and the camera; and a tube of flexible opaque material is fastened to the lens standard and camera about the lens openings thereof so that the negative lens or lenses also are inside the tube. The lens standard is thereby movable on the guide between a position where it locates the objective at the camera's lens opening for a normal focusing range and a position remote therefrom where the negative lenses may be positioned behind the objective for telephoto effect.

17 Claims, 14 Drawing Figures

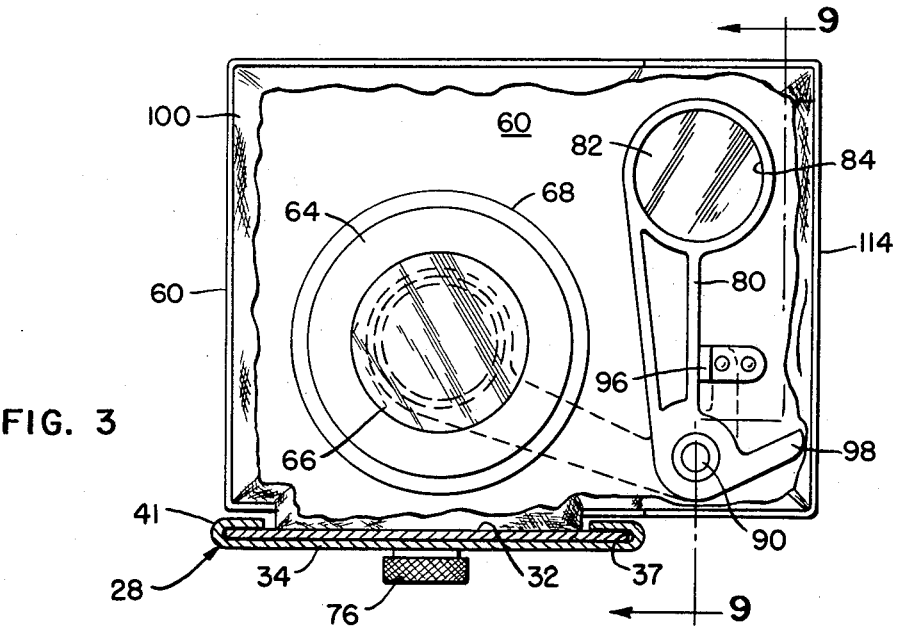
FIG. 3
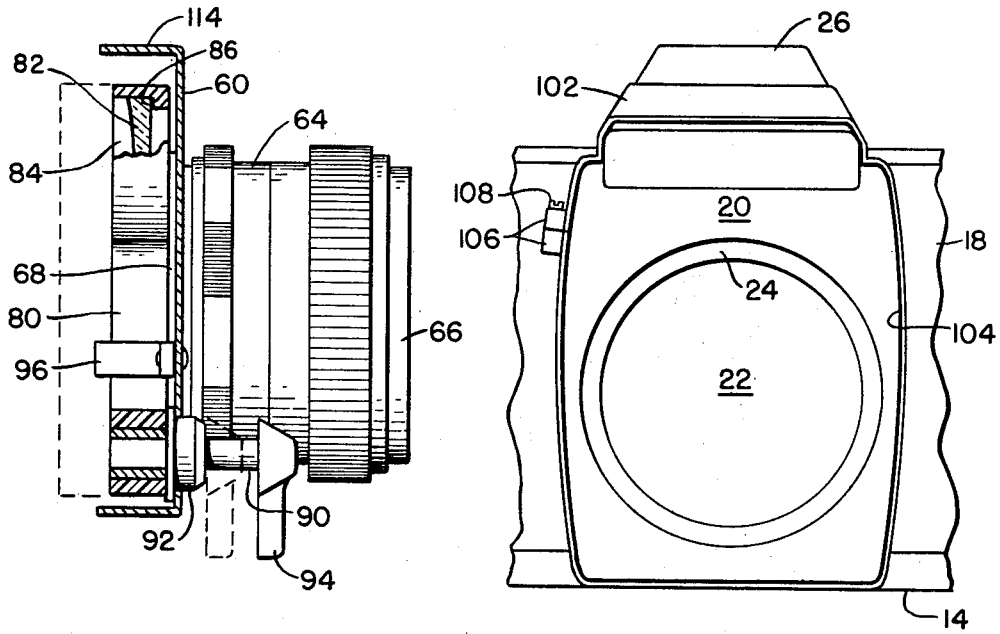
FIG. 9
FIG. 4

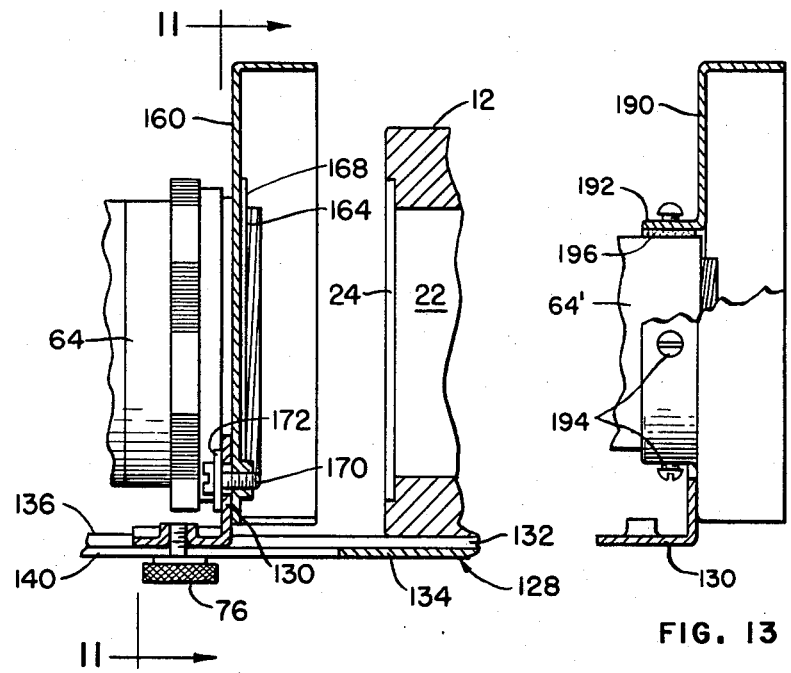
FIG. 10
FIG. 13
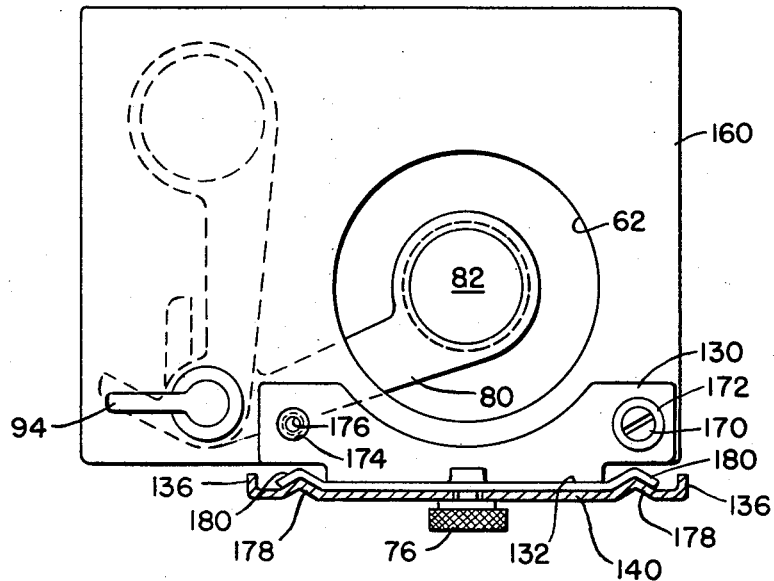
FIG. 11
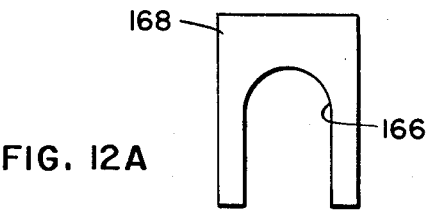
FIG. 12A
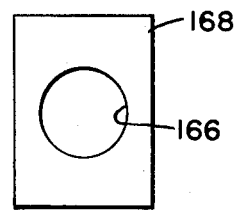
FIG. 12B

MULTIFOCAL ADAPTER FOR CAMERAS

This invention relates to an adapter or attachment which may be fastened to a camera to multiply the focal length of its objective.

In my earlier issued U.S. Pat. Nos. 3,185,061 and 3,388,650 I disclose and claim a camera and an accessory for a camera respectively, as well as a new type lens system, wherein the camera objective is movable between a position near to the camera film plane where it is useful alone for focusing at infinity and a position more remote therefrom where it allows for the insertion of a negative lens therebetween and the camera film plane to permit focusing of a magnified image. The change from one focal length setting of the objective to another is obtainable without having to remove the objective from the camera or to dismount the accessory from the camera once assembled therewith.

A principal object of the present invention is to provide a novel and improved, compact structure by which a camera may be adapted to achieve the aims and objects of the invention described and claimed in my above-mentioned patents.

A second and equally important object of this invention is to provide such structure which the user can easily install after first removing the objective and mounting flange from the camera.

Still another object of the invention is to provide such a structure which is efficient and effective in its operation and also is economical to manufacture.

Although not limited thereto, this invention has particular application to today's 35 mm single lens reflex cameras which, since their advent about 1935, are basically box cameras made as thin as possible while leaving just room enough for the mirror to clear the back of the objective as it is pivoted upwardly out of the way in releasing the shutter to make the exposure, the focusing means of the objective being also built into the lens mount. Conventionally the "normal" or standard objective for these cameras has a focal length of 50 mm to 58 mm and to treble the focal length thereof using a negative lens positioned behind it in the telephoto manner it is necessary to move the objective a distance of roughly 75 mm forwardly of its normal infinity position. In my above mentioned patents I show how this axial adjustment can be obtained using extension tubes or bellows. Such work well when one has control over the physical dimensions and/or shape of the camera housing and the mount for its objective. However, to provide an attachment or an adapter which will work well on available objective mounts and camera housings without having to rework or alter either the camera housing or its objective mount has imposed a problem and the present invention is directed particularly to a solution of this problem.

In accordance with this invention, a camera adapter for this purpose comprises at least two telescoping or slidably related members, one of which is fastened to the underside of the camera as by means of a clamp screw which is threaded into the tripod mounting socket of the camera. The other members comprises a lens standard having a slide portion which interfits with track means on a portion of the first member which projects forwardly of the camera. The lens standard includes a further portion which projects at right angles to its supporting slide portion and which is adapted to receive and position the camera objective and its mount when removed from the camera lens opening.

When remounting the camera objective and its mount on the lens standard, the flange about the camera lens opening into which the objective mount threads is removed from the camera and it or a similar but thinner flange is utilized to secure the objective mount to the lens standard. Alternatively, a sheet metal clip may be used in place of the flange by wedging it in the groove between the last thread of the objective mount and the lens standard. In place thereof, a cupped open end mount may be used which allows the objective mount to be positioned therethrough and fixed in a required centered as well as axial relation to the camera lens opening. The cupped mount therefore will allow precise relocation of the objective with its rear surface at the camera front as the camera manufacturer originally intended in the camera lens opening as well as a precise centering in the camera lens opening.

Thus, it is a feature of the present invention that when mounted on the lens standard of the adapter, the objective can by closing the adapter still assume its conventional position within the camera lens opening for normal focusing at infinity as well as being moved axially with the lens standard to a position remote therefrom.

In its presently preferred form, the member fastened to the underside of the camera projects forwardly of the camera a distance approximating the axial dimension of the objective and its mount when in their closed compact position. Thus, it is a feature of the invention that with installation of the adapter the csmera's dimensions remain substantially unchanged.

It is a feature of the invention that the objective lens mount portion of the lens standard supports negative lenses for pivotal movement into and out of axial alignment with said lens mount receiving aperture thereof. These negative lenses when aligned between the objective and the camera lens opening change the focal length of the objective to permit focusing a magnified image on the camera film plane.

It is also a feature of the invention that the negative lens mounts are displaceable axially from a position close to the lens standard which allows the standard to be compactly closed against the camera front and a more remote position therefrom which allows the negative lens to swing clear of the inner end of the objective lens mount which protrudes through the lens standard opening in order that it can seat within the camera lens opening in its normal location as when the lens standard is closed. Said axial displacement of the negative lens mount also accommodates axial adjustment of the spacing of the negative lens forwardly of the objective to sharply focus the camera lens in its telephoto mode.

Still another feature of the invention is that means are provided between the lens standard and the camera front which exclude the admission of ambient light other than through the lens opening of the adapter in all positions of axial adjustment of its lens standard.

Many other objects, advantages and/or features of the invention will be at once apparent or will become so from the description of the presently preferred embodiment of the invention which follows:

Referring now to the accompanying drawings:

FIG. 3 is a sectional view taken through the adapter along lines 3—3 of FIG. 2 looking in the direction indicated by the arrows;

FIG. 4 is a sectional view taken along the same line of FIG. 2, but looking in the opposite direction as indicated by the arrows 4—4;

FIG. 9 is a vertical sectional view taken through the adapter along lines 9—9 of FIG. 3 and illustrates details in the construction and mounting of the negative lens support;

FIG. 10 is a vertical sectional view taken longitudinally through a second embodiment of the invention;

FIG. 11 is a sectional view taken along lines 11—11 of FIG. 10 looking in the direction indicated by the arrows;

FIGS. 12a and 12b are views of a sheet metal clip used in place of an internally threaded collar to secure an objective to the lens standard of the adapter comprising the invention; and FIG. 13 shows a modified lens standard employing a cup mount in which the camera objective may be adjustably secured.

Figure 1:
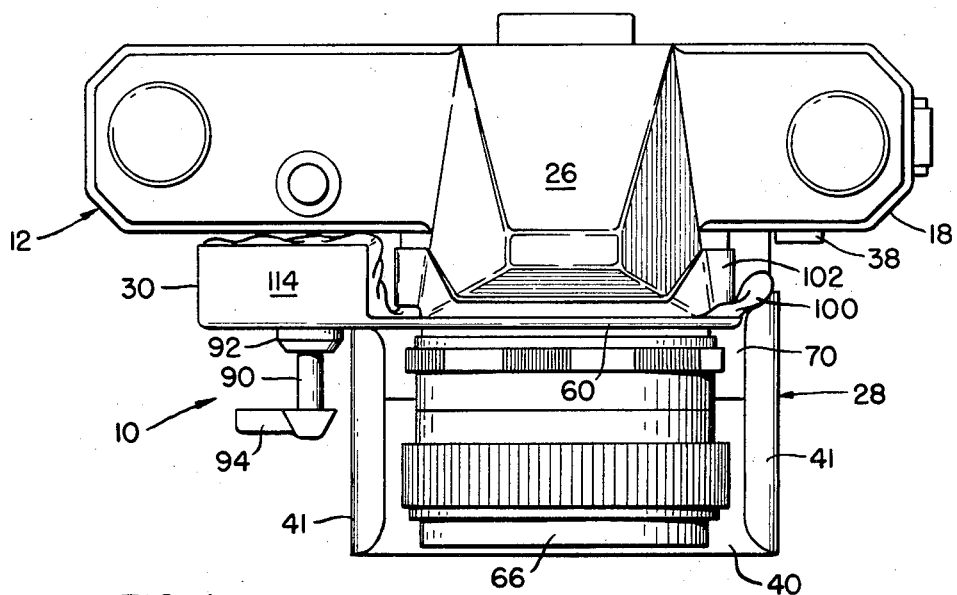
FIG. 1 is a top plan view of a 35 mm. SLR camera having assembled therewith a multifocal adapter in accordance with this invention.
Figure 2:
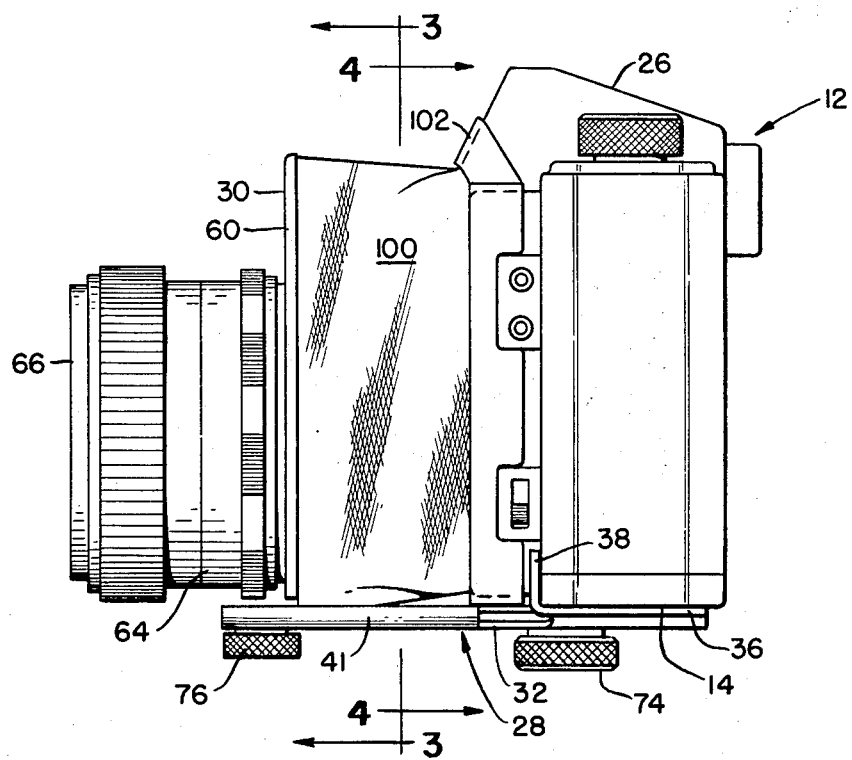
FIG. 2 is a side elevational view thereof.

Referring now more particularly to the several views wherein like parts are identified by like reference numerals and first to FIGS. 1 and 2, the invention is illustrated as embodied in an adapter indicated generally at 10. In the figures the adapter is shown mounted in its position of use on a 35 mm SLR camera of conventional construction. The camera itself is not a part of the present invention; however, in order to explain the invention and how the adapter is assembled with the camera, it is necessary to understand that housing 12 of the usual 35 mm SLR camera has an underside or bottom wall 14 which is more or less flat and which side is usually provided with an internally threaded hole 16 (FIG. 6) which serves as means by which the camera may be mounted on a tripod. Such cameras also usually have a forwardly projecting portion 20 on their front side or wall 18 which is spaced inwardly of their left and right hand sides and contains an aperture 22 with respect to which the objective lens and its mount are disposed and aligned for focusing on the camera film plane located within the housing 12. About the periphery of aperture 22 is an annular recess 24 in which is secured an internally threaded flange or other mount as by screws. This flange serves as a support for the objective lens mount which is secured thereto. The lens mount in turn supports the objective for axial adjustment with respect to the camera film plane as in sharpening the focus of an image thereon. Capping projection 20, and extending above the surrounding top wall of the camera, is a pentahedron shaped portion 26 which contains the pentaprism constituting the camera viewer. The above is descriptive of most cameras of this class as they are usually available in today's market and with which the present invention in a multifocal adapter is particularly useful. However, the invention is also useful with other constructions of cameras as will be clear from the discussion which follows.

The present invention provides an adapter indicated generally at 10 by means of which the camera objective may be optionally located at a more remote position from the camera front so as to allow negative lenses to be inserted therebetween and the camera film plane in order to permit the camera to be used in a telephoto mode. Referring now to the illustrated embodiment of the invention, such an adapter 10 comprises a first or guide member indicated generally at 28 and a second member hereinafter more particularly identified as a lens standard 30, the latter having a portion 32 which telescopes, interfits with or is otherwise slidably assembled with the first or guide member 28. Both members are preferably constructed of metal stampings or cast to comprise the shapes and perform the functions as hereinafterwards described.

Figure 5:
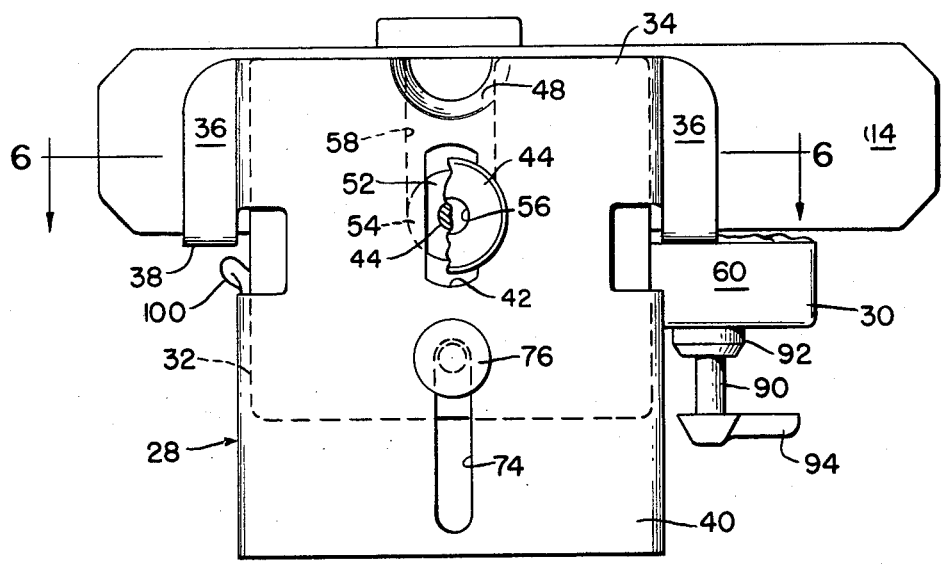
FIG. 5 is a bottom plan view of the camera with the adapter assembled therewith.
Figure 6:
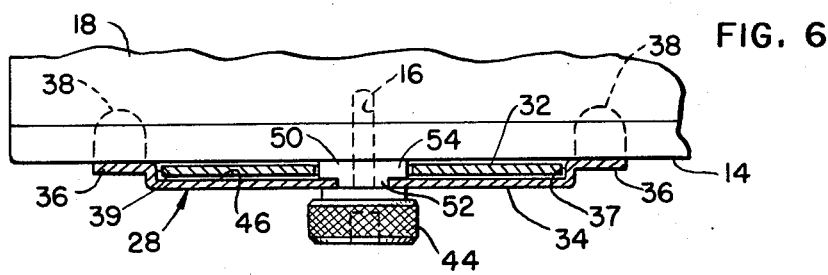
FIG. 6 is a fragmented sectional view taken along lines 6—6 of FIG. 5 and illustrates the manner of fastening the adapter to the underside of the camera.
Figure 8:
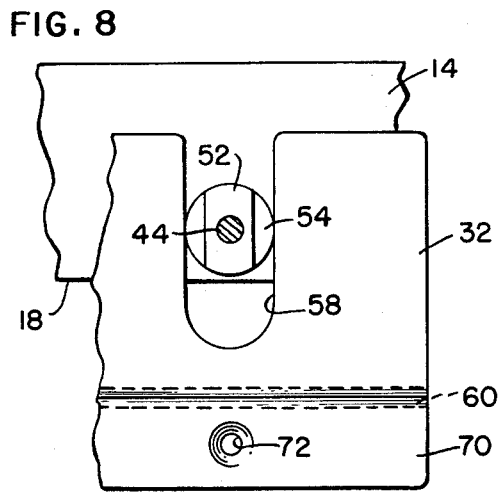
FIG. 8 is a fragmented bottom plan view of the lens standard considered as taken from the bottom of FIG. 7, the cooperating guide by which the adapter is fastened to the camera being omitted.

As perhaps most clearly shown by FIGS. 5 and 6, guide member 28 comprises a flat plate-like portion 34 having a pair of offset portions 36 along the rear half of its two opposite sides which terminate in forwardly located upturned ears 38 for engaging the front 18 of the camera housing as when its offset portions 36 engage the camera underside 14. Guide member 28 also has a further portion 40 which extends forwardly of said ears 38 and lies in the plane of portion 34 thereof. The further portion 40 has its opposed sides folded over to present a pair of parallel spaced channels 41, the bases 39 of which align with the inner sides 37 of the offset portions 36 and constitute a track along which portion 32 of the lens standard is guided in its slidable assembly with guide member 28. Preferably, extension portion 40 has a length such that it does not extend beyond the length of the camera objective when the objective is assembled on the lens standard 30 and the latter is in its closed position against the front of the camera as afterwards described.

At 42 is an opening or slot in flat portion 34 of the guide member which can be aligned with the tripod socket hole 16 in the underside of the camera when ears 38 engage with the camera front 14. At 44 is a clamp screw having a stem which extends through said slot 42 and threadedly connects into the tripod socket hole 16 to releasably secure the guide member 28 to the underside of the camera housing 12. This leaves a space 46 therebetween corresponding to the height of the inner walls 37 of the offset portions 36 in which portions 32 of the lens standard 28 slidably interfits. As seen in FIG. 5, guide member 28 is also provided with an arcuately raised portion 48 of a similar height which cooperates with offset portions 36 to maintain space 46.

Preferably, as illustrated by FIGS. 5 and 6, the stem of clamp screw 44 is passed through an apertured stepped collar or washer 50 having a reduced portion 52 with parallel straight sides which fit in said slot 42 so as to be held therein against rotation. Washer 50 includes a larger-diametered portion 54 underlying portions of the flat like portion 34 of the guide member on either side of slot 42 therebetween and the underside 14 of the camera housing. Reduced section 52 of washer 50 has a depth no greater than the thickness of portion 34 while its larger-diametered section 54 has a thickness no less than that of the height of wall 37 of the offset portions 36 such that when clamp screw 44 is tightened within socket 16, portion 34 of the guide member is firmly clamped between the upper surface of washer section 54 and the head of clamp screw 44 so as to securely fasten the guide member to the underside of the camera housing. The thickness of the larger diametered section 54 of the washer, however, assures that sufficient space is left between said portion 34 of the guide member and the underside 14 of the camera housing to accommodate free sliding movement of portion 32 of the lens standard 30 therein without binding.

Any other suitable means for securely fastening guide member 28 to the underside of the camera housing 12 may be employed. Preferably, also, the head of clamping screw 44 is provided with an internally threaded hole 56 which is then available for mounting the camera on a tripod.

As illustrated by FIG. 5, slide portion 32 of the lens standard includes a first slot 58 which opens into the rear edge thereof and this slot is sufficiently wide so as to clear washer 50 and arcuate portion 48 when the lens standard portion 32 is slid into the space 46 between the underside portion of the camera housing and portion 34 of the guide member 28. As previously noted, slide portion 32 of the lens standard 30 also has a width such that it slidably engages side walls 37 and 39 of the guide member 28 so as to be guided thereby in a rectilinear path. Upturned ears 38, when engaging the front wall of the camera housing so locate the guide member 28 that the path of movement of the lens standard parallels the optical axis of the camera 12 with which the adapter is assembled.

Figure 7:
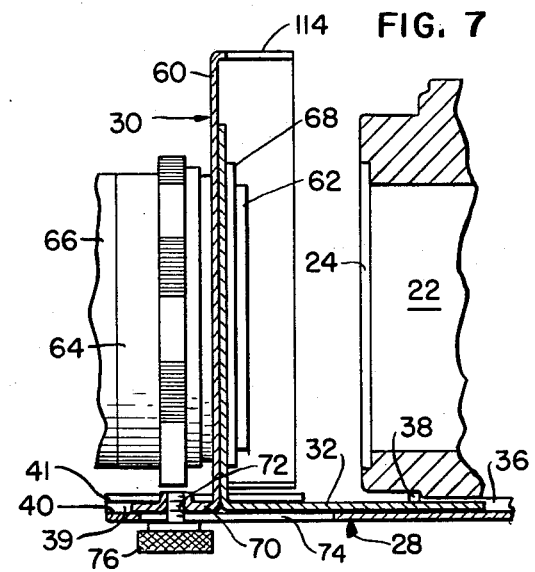
FIG. 7 is a fragmented side view taken in vertical section through the adapter and the front of the camera with which it is assembled.

As illustrated in FIG. 7, lens standard 30 includes an upturned portion or lens board 60 which is disposed at right angles with slide portion 32 and has a circular-shaped opening 62 therein centered at a height above said slide portion 32 for receiving the end of the camera objective mount 64 and locating the objective mount in axial alignment with aperture 22 in the camera housing. Objective mount 64 is secured within opening 62 by means of an internally threaded flange 68 which may comprise the flange which was removed from recess 24 in the camera housing front 18. When so mounted, the objective 66 may be moved with upright 60 of the lens standard 30 to a closed position against the front of the camera housing where mounting flange 68 engages in recess 24. In this position the objective lens assumes substantially its original position in lens opening 22 of the camera. Actually, however, if the flange which was removed from the camera is utilized at 68, then the innermost position of the camera lens to which it may be adjusted when mounted on the adapter will fall short of its original most inward position relative to the camera film plane by an amount equal to the thickness of the upright 60 to which it is now attached. However, this may be compensated by suitably recessing the upright and/or using a correspondingly thinner flange for securing the camera lens mount 64 to the upright lens board 60. Instead of tightening flange 68 on the threaded end of the lens mount 64, a thin flat sheet metal clip or other locking member 168 may be used by wedging it in groove 164 between the body of the lens mount and its first thread, the material of the clip firmly engaging the adjacent surface of lens standard upright 60 about the lens mount as illustrated in FIG. 10. Clip 168 for this purpose may have a U-shaped opening 170 in its lower edge as illustrated in FIG. 12a or a circular shape as illustrated in FIG. 12b. Sheet metal clip 168 also may be slightly cupped or bent to assure its positive engagement against the surface of upright 60 about opening 62 therein to hold the objective in an axially correct stable position.

Considering now FIG. 5 with FIG. 7, lens standard 30 also includes a portion 70 which extends forwardly of its upright 60 and lies in the plane of slide portion 32. This portion 70 is provided with a threaded opening 72 which aligns with an elongated slot 74 through which the stem of a second clamping screw 76 extends for threaded engagement into threaded openings 72. When tightened, clamp screw 76 thus serves as means to lock the lens standard in a desired spatial position from the camera front 18, for example, the closed position as discussed above and illustrated by FIG. 1 or in an open or more remote position as illustrated by FIGS. 2 and 7.

FIGS. 10 and 11 illustrate an alternate construction of lens standard which utilizes a separately constituted member 160 to which the objective mounting is assembled. In the first described embodiment the lens board 60 to which the objective is mounted is formed integral with slide 32 or by being subsequently welded to slide 32. However, in this alternate construction, the extrusion 132 replacing slide 32 and its extension 70 also includes a right angularly disposed stub 130 of substantially shorter height than upright 60 and to which the objective mounting member or lens board 160 is fastened by means of bolts 170 which are assembled with washers 172 and passed through enlarged openings 174 in the lower margin of said stub 130 and tightened in internally threaded opening 176 in lens board 160. Before bolts 170 are tightened, lens board 160 may be adjusted both laterally and vertically in order to accurately center the objective 64 with the camera aperture 22 within the limits permitted by the oversize dimensions of the holes. The fastening bolts 170 are then tightened to secure the lens board 160 in its adjusted position. Thus, the adapter of FIGS. 10–11 has universal application to a number of cameras, each having different spacings of camera base to aperture center.

FIG. 13 illustrate a still further construction of lens standard wherein a lens board 190 is utilized having a cup flange or mount 192 through which the objective 64 is extended and secured in place as by set screws 194 which pass through a gasket or light seal 196. In other respects lens board 190 is similarly constructed as member 160 and is shown mounted to stub 130 as by bolts 170. Set screws 194 cooperate with bolts 170 and the oversize openings 170 in stub 130 to accommodate a latitude of lateral adjustment of the objective to facilitate precise centering of the objective on the axis of the camera lens opening. The embodiment of FIG. 13 is particularly useful where the camera objective 64' has a bayonet or breech lock mount. It also increases the latitude permitted in axially locating the objective mount 64' with reference to the camera front. It will be understood that to satisfy peculiarities of some camera objectives it may be desirable to relocate the cup flange 192 on the reverse or camera side of the lens board 190.

FIG. 11 illustrates a modified construction of guide member 28 which also may be utilized in any of the previously described embodiments. In this modification portions 134 and 140 of the guide member 128 are provided with parallel spaced V-shaped tracks 178 struck therefrom and slide portion 132 of the lens standard has similarly struck parallel spaced V-shaped grooves 180 which interfit and slidably engage with said V-shaped tracks 178. The thus struck V-shaped grooves 180 and tracks 178 may be accurately located for guiding the lens standard in its rectilinear movement relative to the camera front. In its preferred form, V-shaped grooves 180 and tracks 178 extend the full length of the guide member 128 and slide portion 132 of the lens standard, replacing both channels 41 on opposed sides of extension 40 of the slide and also offset portions 36 and inner sides 37 of the guide portion 32. As in the case of the first described embodiment, plate portion 134 of the guide member has its opposed side edges 136 also turned upwardly to engage the bottom wall of the camera leaving a space between plates 134 and the bottom wall of the camera housing sufficient to permit assembly of slide 132 of the lens standard therebetween. Any other suitable track means which will assure true rectilinear sliding movement between the guide member 28 and the lens standard 30 may also be utilized.

Adapter 10 in each of said illustrated and described forms thereof provides means by which the objective may be moved between its close or infinity focusing position and a position or positions more remote therefrom through adjustment of the lens standard in the guide member 28 away from the camera front within the limits permitted by slot 74. In said more remote position or positions one or more negative lenses 82 can be located in axial alignment with the objective therebetween and the film camera film plane to permit a telephoto effect. It is a feature of the invention that the negative lens or lenses so used are also supported by the previously described lens boards 60, 160 and 190 of the lens standard. FIGS. 3 and 9 show one such means of support for a negative lens 82 as comprising an arm 80 pivotally mounted on the rear side of upright 60 to one side of lens mount receiving opening 62. Said pivot arm 80 may be molded or otherwise cast of suitable synthetic resin and, as illustrated is provided with an opening 84 through its free end with a peripherally disposed recessed shelf 86 on which the edge of the negative lens 82 rests. The diameter of opening 84 may be related to the diameter of the lens 82 so that the latter is frictionally held therein against shelf 86 or it is cemented in place. Any other suitable means of securing the negative lens in said opening 84 also may be employed. The opposite or pivotally mounted end of pivot arm 80 has a right angularly disposed integral pivot element 90 which extends through a provided bearing 92 in the upright 60. It has an operating lever 94 secured to the outer end thereof. Lever 94 is therefore conveniently available for swinging the negative lens arm 80 and its lens between a position of rest to one side of the objective which is illustrated by full lines in FIG. 3 to a position of use in axial alignment behind the objective which is illustrated by the dash lines of said FIG. 3. 96 represents a stop on upright 60 against which pivot arm 80 engages when in its position of rest. Arm 80 also includes a portion 98 angularly offset therefrom which engages said stop 96 when arm 80 has been swung far enough to locate lens 82 into its required axial alignment with the objective.

However, more than one such arm 80 may be provided and/or said arm may support more than one negative lens arranged thereon for sequential alignment behind the objective lens with pivoting of arm 80. Where more than one pivoted arm is provided they may be located to opposite sides of opening 62 and so as to permit one or more than one lens to be simultaneously aligned behind the objective.

In their off side position, the negative lens 82 and its supporting pivot arm 80 are located close to the inner side of upright 60 in which position they lie to one side of the projection 20 on the camera front 18 and therefore do not interfere with closing of the upright 60 against projection 20 on the camera front 18 as when the objective is to assume its normal position in the camera lens opening 22. However, because the objective mount 64 necessarily protrudes somewhat beyond the inner surface of the upright 60, the right angled pivot 90 of arm 80 is made axially slidable in bearing 92 so that arm 80 may be moved from a position close to the inner side of the lens mount 60 as illustrated by solid lines to a position spaced rearwardly thereof as shown by dotted lines. In this new position, the negative lens and its pivot arm 80 are able to swing clear of the protruding end of the objective lens mount 62 as it is pivoted into axial alignment therewith. The thus permitted axial adjustment of the negative lens also facilitate adjustment of its spacing behind the objective and thereby is useful to sharpen the focus of the camera objective when used in its telephoto mode with the negative lens.

At 100 is illustrated a tubular passage member of thin, limp, flexible opaque black plastic such as polyethylene. Member 100 has an internal diameter at its outer end large enough to enclose the area within which the negative lens and its mount swings between its closed and useful positions. The outer end of member 100 is adhesively secured or otherwise fastened to the outer periphery of the upright 60 of the lens standard on all four sides thereof and so encloses the objective mount opening 62 therein as well as said offset position of the negative lens mount 80. The opposite or inner end of said member 100 is similarly fastened as by adhesive to a split clamping ring 102 which as shown in FIG. 4 is preferably preformed to approximate the peripheral shape of the projection 20 including the surface portion of the pentahedron 26 which immediately overlies said projection 20 on the camera housing 12. Secured to the inner side of clamp ring 102 is a gasket 104 of a suitable resilient material and the meeting ends of the clamp ring 102 have aligned internally threaded lugs 106 joined together by screws 108. With clamp ring 102 positioned about the projection 20 screw 108 may be tightened within lugs 106 causing clamp ring 102 and its gasket 104 to tightly engage about said projection 20 and surface of the pentahedron 26. Gasket 104 being of resilient material compresses between the clamp ring and the peripheral surfaces of the camera housing to effect a light tight seal therebetween. Any other suitable means for securing light passage member 100 to the camera housing may be employed. Other means such as an expandable baffle or bellows might also be utilized as member 100. As illustrated in FIG. 1, clamp ring 102 is also provided with cutouts where needed to provide access to operating elements of the camera which might otherwise be covered when the adapter is thus assembled to the camera housing.

The method of assemblying the adapter to the camera is believed evident from the above description of its structure. However, to briefly review, the objective lens 66 and its mount 64 are first removed from the camera by unscrewing mount 64 from its supporting flange 68. Flange 68 is then removed from the camera by loosening its securing screws to thus expose the peripheral recess 24 about the lens opening 22 of the camera housing. The camera objective is then remounted on the lens standard 30 of the adapter by passing the externally threaded inner end of its mount 64 through aperture 62 in lens board 60 and rethreading the same but preferably a thinner flange 68 thereabout and tightening the same until the lens mount 64 is secured to the upright 62 of the lens standard. In the case of the FIG. 10, 11 embodiment bolts 170 may also be loosened to allow horizontal and vertical alignment of the lens board 160 to center the objective on the axis of the camera lens opening 22. The adjustment is then locked by tightening bolts 170. When lens board 190 is employed, the objective is passed through flange mount 192 until its forward edge is located at the required distance forwardly of lens board 190. It is then secured in this position by tightening set screws 194. The set screws may be tightened differing amounts if necessary to complete centering of the mount 64' with the camera lens opening 22. Depending on the characterization of the objective 64', it may be desirable to utilize a lens board 190 in which the mounting flange 192 is on the reverse side, that is directed toward the camera when assembled therewith. The previously described flat sheet metal clips 168 may also be used in place of washer 68 as above described. Guide member 28 is also assembled with the underside of the camera housing by locating its ears 38 against the camera front 18 after locating washer 50 with its reduced end 50 in slot 42. Clamp screw 44 is then passed through washer 50 and threaded into the tripod receiving socket 16 of the camera underside until the guide member appears securely fastened thereto. The lens standard with the objective mounted thereto can then be assembled with the guiding member 28 by fitting its slide portion 32 between the track means defined by walls 37, 39 or on vee tracks 178 of the flat portion of the guide member after which clamp screw 76 is tightened into opening 74 of the lens standard. Preferably, the lens standard 30 is initially secured to the guide member in its remote position so as to allow working space when attaching the light occluding passage member 100 to the camera housing. The member is attached to the camera by positioning its clamp ring member 102 about the periphery of projection 20 on the camera housing front 18 and tightening screws 108 to effect a light tight seal therewith. This completes the assembly of the adapter to the camera housing.

Thereafter, the camera may be used with its objective in its normal position by loosening clamp screw 74 and sliding the lens standard forward until its upright 60 is close to the camera front and the end of the objective lens extends into opening 22. Clamp screw 76 is then retightened. In this position, which is illustrated in FIG. 1, the light passage member 100 bunches outwardly about the periphery of the lens standard but being fastened thereto outside of projection 20 it does not impede location of the objective on the lens standard into the camera lens opening 22, assuming the use of a thinner flange 68 as above described, and particularly when using the embodiment of FIG. 13. The latter provides for considerable latitude in spacing of the objective's forward end from its lens board 190. Preferably lens mount 60 is provided with a wall 114 which extends along the base, up one side and across a portion of the upper periphery of its upright so as to surround the area in which the negative lens moves between its axially aligned and off side positions relative to the objective. When it is desired to convert the camera to a longer focal length, as for telephoto focusing, clamp screw 76 is loosened and the lens standard is slid outwardly to a more remote position within the limits of the elongated slot 74. Clamp screw 76 is then retightened in order to fix the lens standard in said extended position. Preferably light passage member 100 has an axial dimension such that in said extended position it is drawn relatively taut and has minimum sag. If desired, elastic elements may be secured between clamp ring 102 and the upright 60 at selected intervals about the periphery of the light passage member 100 which members expand or stretch as the lens standard is moved outwardly and are useful to prevent such sag. With the lens standard in its extended position the user need only to push in on lever 94 so as to move arm 80 and its negative lens 82 into a position where they can be swung clear of the inner end of the objective lens and its mount 64 to permit their axial alignment between the objective and the camera film plane as defined by engagement of portion 98 with stop 96.

From the aforesaid description, it will thus be apparent that all of the recited objects, advantages and features of the invention have been demonstrated as obtainable in a highly practical manner. It furthermore will be understood that the above description is to be considered only as exemplary of the invention and that many variations as well as rearrangements of the described parts and elements constituting the adapter may be realized all within the spirit of the invention, the same being defined by the amended claims.

Having described my invention, I claim:

1. A multifocal adapter for a camera having a camera lens opening in the front wall thereof in which an objective is removably mounted, said adapter comprising a first member fastenable to the underside of the camera behind the front wall thereof and having a portion projecting forwardly of the camera front wall when so fastened, track defining means on said projecting portion, and a lens standard including a slide portion slidably mounted in said track defining means for movement in directions parallel to the axis of the camera lens opening when the first member is properly fastened to the camera, said lens standard including an upright portion fixed to said slide portion, said upright portion having an aperture into which the camera objective may be mounted in axial alignment with the camera lens opening in the front wall of the camera, and a flexible opaque passage member secured at one end to said upright portion of the lens standard about said aperture, and means for fastening the opposite end of said passage member to the camera about the camera lens opening in the front wall thereof, said passage member accommodating axial movement of the lens standard on said projecting portion of the first member between a position close to the front wall of the camera where an objective mounted on the lens standard will seat in said camera lens opening and a position remote therefrom, at least one negative lens, and means movably supporting said negative lens on the upright portion of the lens standard within the enclosure of said passage member, externally located operating means connected to said negative lens supporting means for positionment of the negative lens into and out of axial alignment with the lens mounting aperture of said lens standard therebetween and the camera front wall, and clamping means for securing the slide portion of the lens standard to the first member at said close and remote positions.

2. A multifocal adapter as claimed in claim 1 wherein the track defining means are integral with the projecting portion of the first member.

3. A multifocal adapter as claimed in claim 1 wherein the track defining means embody a further portion slidable on said projecting portion of the first member.

4. A multifocal adapter as claimed in claim 1 wherein the track defining means are in telescoping relation with the first member and lens standard.

5. A multifocal adapter as claimed in claim 1 wherein the passage member is comprised of thin highly limp, flexible opaque material.

6. A multifocal adapter as claimed in claim 1 wherein the negative lens supporting means is pivotally mounted to the lens standard offset from the aperture in which the objective is mounted.

7. A multifocal adapter as claimed in claim 6, the negative lens support also being movable axially.

8. A multifocal adapter for a camera having an objective lens receiving opening in the front wall thereof and a tripod mounting hole in the bottom wall thereof, said adapter comprising a guide member having an opening therein alignable with the tripod mounting hole and fastenable to the bottom wall of the camera by a clamp screw which passes through said opening and threadedly connects into said tripod mounting hole of the camera, said guide member having a forwardly projecting portion of a length to extend forwardly of the camera front wall when so fastened, and a lens standard including a slide portion slidably received in said forwardly projecting portion of the guide member, said lens standard having a lens mounting portion disposed at right angles to its slide portion so as to be located forwardly of the front wall of the camera and adapted to support an objective in alignment with the objective lens receiving opening thereof when said guide member is fastened to the bottom wall of the camera, and at least one negative lens mounted on the camera-directed side of said lens standard for transverse movement between a first position in and a second lateral position out of axial alignment with an objective when mounted on the lens standard, a tubular shaped passage member of flexible opaque material secured at one end to the lens mounting portion about both said in and out positions of the negative lens and fastenable at its other end to about the objective lens opening of the camera, and externally located means on said lens mounting means for moving the negative lens between said positions, said lens standard being movable on the guide member between a position where an objective mounted on its lens mounting portion is adajcent the objective lens receiving opening of the camera and a position axially remote therefrom, and means for releasably locking the lens standard to the guide member in said adjusted positions.

9. A multifocal adapter for a camera as claimed in claim 8, the lens mounting portion of the lens standard being adjustably supported on the slide portion to accommodate centering of an objective supported thereon with respect to the objective lens receiving opening in the front wall of a camera with which the adapter is assembled.

10. A multifocal adapter for a camera as claimed in claim 8 having a negative lens support pivotally mounted on said lens mounting portion for transverse movement of a negative lens supported thereby into and out of axial alignment with an objective lens mounted on said lens mounting portion.

11. A multifocal adapter for a camera as claimed in claim 10 wherein the negative lens support is also adjustable axially of the objective lens.

12. A multifocal adapter as claimed in claim 8 wherein the lens mounting portion of the lens standard includes an aperture through which the mount for an objective lens extends, and flange means which connect to the extending portion of the objective mount to fasten the mount to the lens standard.

13. A multifocal adapter as claimed in claim 12 wherein the lens mounting portion of the lens standard supports a negative lens for movement axially and transversely with respect to said aperture in the lens mounting portion of the lens standard.

14. A multifocal adapter as claimed in claim 8 wherein the lens mounting portions of the lens standard accommodates axial adjustment of the objective mount thereon, and means for locking the objective mount in an axially adjusted position.

15. A multifocal adapter as claimed in claim 1 wherein the lens standard includes a flanged portion about the aperture into which the camera objective is mounted, and means for locking the objective in a desired axially adjusted and centered relation to said aperture.

16. A multifocal adapter for a camera having an opening in the front wall thereof to receive a removable objective and mount therefor, said adapter comprising at least two members in telescopic relation, one of said members being fastenable to the underside of a camera behind the front wall thereof and extending forwardly thereof, another of said members sliding on said one member and having means for supporting an objective lens mount forwardly of the camera front wall in alignment with the camera lens opening when the camera objective and its mount has been removed therefrom, at least one negative lens movably supported on the camera facing side of the another member for location into and out of axial alignment with the objective therebetween and the camera lens opening, the another of said members being movable in its telescopic relation with the one of said members between a first position where it supports the objective lens mount at said camera lens opening with the negative lens out of axial alignment with the objective lens, and a second position axially spaced forwardly thereof, where the negative lens is movable into axial alignment with the objective lens, and means enclosing the space between said objective mount means and camera front including the camera lens opening and negative lens for inhibiting the passage of light to the camera lens opening other than through the means for supporting an objective mount.

17. A multifocal adapter as claimed in claim 16 wherein the negative lens is also movable axially with respect to said objective lens mount.

* * * * *